United States Patent [19]

Kawamoto

[11] Patent Number: 5,231,498
[45] Date of Patent: Jul. 27, 1993

[54] DIGITAL WIPE PATTERN GENERATING DEVICE

[75] Inventor: Sigeharu Kawamoto, Yokohama, Japan

[73] Assignee: Matsushita Electric Industrial Co., Ltd., Osaka, Japan

[21] Appl. No.: 714,922

[22] Filed: Jun. 13, 1991

[30] Foreign Application Priority Data

Jun. 21, 1990 [JP] Japan .................................. 2-163324

[51] Int. Cl.⁵ .......................................... H04N 5/272
[52] U.S. Cl. .................................................. 358/183
[58] Field of Search ........................... 358/183, 182, 22

[56] References Cited

U.S. PATENT DOCUMENTS 3,821,468  6/1974  Busch ..................................... 358/183
4,508,700  3/1990  Ishii et al. ........................... 358/183 X
4,805,022  2/1989  Abt ........................................ 358/183

FOREIGN PATENT DOCUMENTS 0125989 11/1984 European Pat. Off. .
0329339  8/1989 European Pat. Off. .
60-34309  8/1985 Japan .
60-34870  8/1985 Japan .

Primary Examiner—Victor R. Kostak
Attorney, Agent, or Firm—Stevens, Davis, Miller & Mosher

[57] ABSTRACT

A digital wipe pattern generating device includes address generators for counting horizontal and vertical synchronization pulses to generate addresses; a calculator for obtaining wipe address data by effecting a plurality of sorts of calculations in a digital manner while using predetermined coefficients, combining and selecting arbitrarily results of the calculations; and a device for generating a wipe pattern by slicing the wipe address data at a predetermined slice level. Since all processings are effected in a digital manner, it is easier to fabricate the device, using ASICs or ICs, and thus the scale of the circuits can be reduced.

2 Claims, 2 Drawing Sheets

DIGITAL WIPE PATTERN GENERATING DEVICE

CROSS-REFERENCE TO RELATED APPLICATION

This application relates to U.S. Ser. No. 714,842 entitled "Digital Mixer Circuit" filed Jun. 13, 1991 by Sigeharu Kawamoto and U.S. Ser. No. 714,865 entitled "Digital Soft Wipe Signal Generating Apparatus" filed Jun. 13, 1991 by Sigeharu Kawamoto, and assigned to the present assignee, based on Japanese Application No. 2-163322 filed Jun. 21, 1990 and No. 2-163323 filed Jun. 21, 1990 and the contents of which are incorporated herein by reference.

BACKGROUND OF THE INVENTION

The present invention relates to a digital wipe pattern generating device used in broadcasting apparatuses, etc.

In television broadcast, etc. it is often carried out to inlay a television image in another television image. This inlaid image is inlaid in various shapes. The shape of this inlaid image is called a wipe pattern, which is generated usually electronically by combining triangular wave, sawtooth wave, etc. of horizontal or vertical synchronization frequency.

FIG. 1 shows the construction of a prior art wipe pattern generating device. In FIG. 1, reference numeral 1 is a horizontal synchronization pulse; 2 is a vertical synchronization pulse; 3 is a delay circuit delaying the horizontal synchronization pulse 1; and 4 is a delay circuit delaying the vertical synchronization pulse 2.

5 is a triangular wave generator, in which the output of the delay circuit 3 stated above is inputted to generate a triangular signal 5a; 6 is a sawtooth wave generator, in which the output of the delay circuit 3 is inputted to generate a sawtooth wave 6a; and 7 is a parabolic wave signal generator, in which similarly the output of the delay circuit 3 is inputted to generate a parabolic wave signal 7a.

8 is a triangular wave generator, in which the output of the delay circuit 4 is inputted to generate a triangular wave signal 8a; 9 is a sawtooth wave generator, in which the output of the delay circuit 4 is inputted to generate a sawtooth wave signal 9a; and 10 is a parabolic wave generator, in which similarly the output of the delay circuit 4 is inputted to generate a parabolic wave signal 10a.

11 is a waveform synthesizer-selector, which combines the triangular wave signal 5a, the sawtooth wave signal 6a and the parabolic wave signal 7a as well as the triangular wave signal 8a, the sawtooth wave signal 9a and the parabolic wave signal 10a, and selects signals of various waveforms on the basis of a control signal 12a from a central processing unit (hereinbelow abbreviated to CPU) 12.

13 is a comparator, which compares the output 11a of the waveform synthesizer-selector 11 with a DC voltage 15 obtained by means of a variable resistor 14 and slices the output 11a of the waveform synthesizer-selector 11 at the level of this DC voltage 15 to output a wipe pattern 16.

Then, the operation of the prior art example will be explained. The delay circuits 3 and 4 function as positioners for the wipe pattern. The delay circuit 3 delays the horizontal synchronization pulse 1 and outputs it to the triangular wave generator 5, the sawtooth wave generator 6 and the parabolic wave signal generator 7.

Similarly the delay circuit 4 delays the vertical synchronization pulse 2 and outputs it to the triangular wave generator 8, the sawtooth wave generator 9 and the parabolic wave signal generator 10.

In this way, the triangular wave generator 5 and 8 output the triangular signals 5a and 8a, respectively, to the waveform synthesizer-selector 11; the sawtooth wave generators 6 and 9 output the sawtooth wave signals 6a and 9a, respectively, to the waveform synthesizer-selector; and at the same time the parabolic wave signal generators 7 and 10 output the parabolic wave signals 7a and 10a, respectively, to the waveform synthesizer-selector 11.

The waveform synthesizer-selector 11 combines the triangular wave signal 5a, the sawtooth wave signal 6a and the parabolic wave signal 7a as well as the triangular wave signal 8a, the sawtooth wave signal 9a and the parabolic wave signal 10a and further selects these signals on the basis of the control signal 12a from the CPU 12 to output them to the comparator 13.

The comparator 13 compares the signal synthesized or selected by this waveform synthesizer-selector 11 with the DC voltage 15 set by means of the variable resistor 14 and slices the output signal of the waveform synthesizer-selector 11 at the level of this DC voltage 15 to output a wipe pattern 16.

However, in the prior art wipe pattern generating device described above, capacitors having great capacities are required for the wave generators 5 to 10 and therefore there was a problem that it cannot be intended to reduce the size, when it is fabricated by using ICs.

Further there was another problem that, when it is required to generate more complicated wipe patterns, more circuits are required correspondingly, which gives rise to increase in the scale of the circuit, and thus more complicated circuit design is necessary.

SUMMARY OF THE INVENTION

Therefore an object of the present invention is to generate various sorts of wipe patterns by selecting a combination of calculations.

Another object of the present invention is to facilitate the fabrication of the device using ASICs or ICs by effecting all the processings in a digital manner for generating wipe patterns.

Still another object of the present invention is to intend to reduce the scale of the circuits.

In order to achieve the above objects, a digital wipe pattern generating device according to the present invention comprises horizontal address generating means, which counts horizontal synchronization pulses to generate a horizontal address for an image; vertical address generating means, which counts vertical synchronization pulses to generate a vertical address for an image; calculating means for obtaining wipe address data by inputting the horizontal address and the vertical address therein, effecting a plurality of sorts of calculations in a digital manner while using predetermined coefficients supplied from a control processing unit, and combining and selecting arbitrarily results of the calculations; and a magnitude comparator for generating a wipe pattern by comparing the wipe address data obtained by the calculating means with a predetermined slice level to slice them at this slice level.

According to the present invention, owing to the construction described above, a number of wipe patterns can be generated by selecting a combination of the calculations and all the processings can be effected in a digital manner. In this way it becomes easier to fabricate the device, using ASICs or ICs and it is possible to intend to reduce the scale of the circuits.

DESCRIPTION OF THE PREFERRED EMBODIMENT

Figure 1:
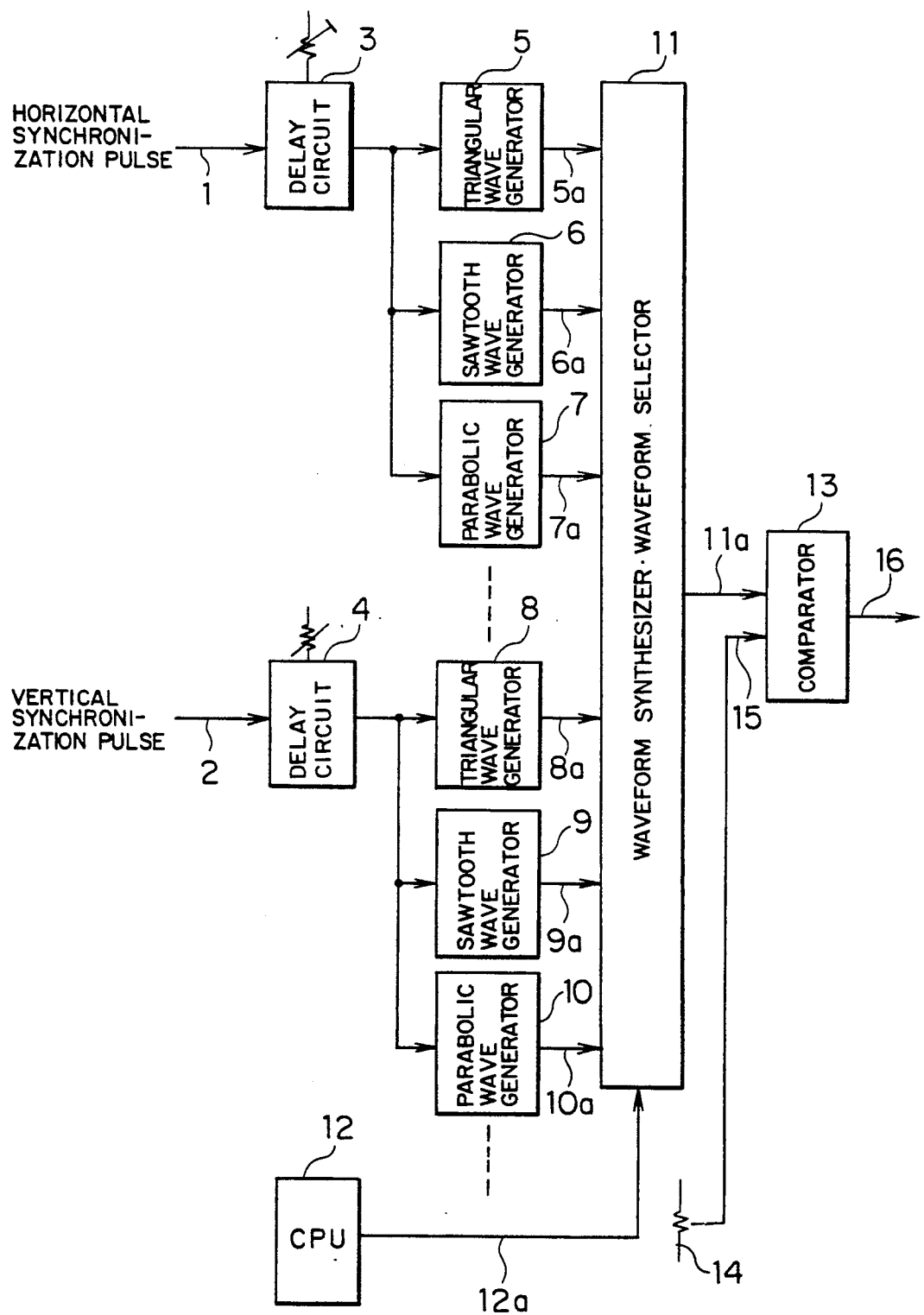
FIG. 1 is an outlined block diagram of a prior art wipe pattern generating device.
Figure 2:
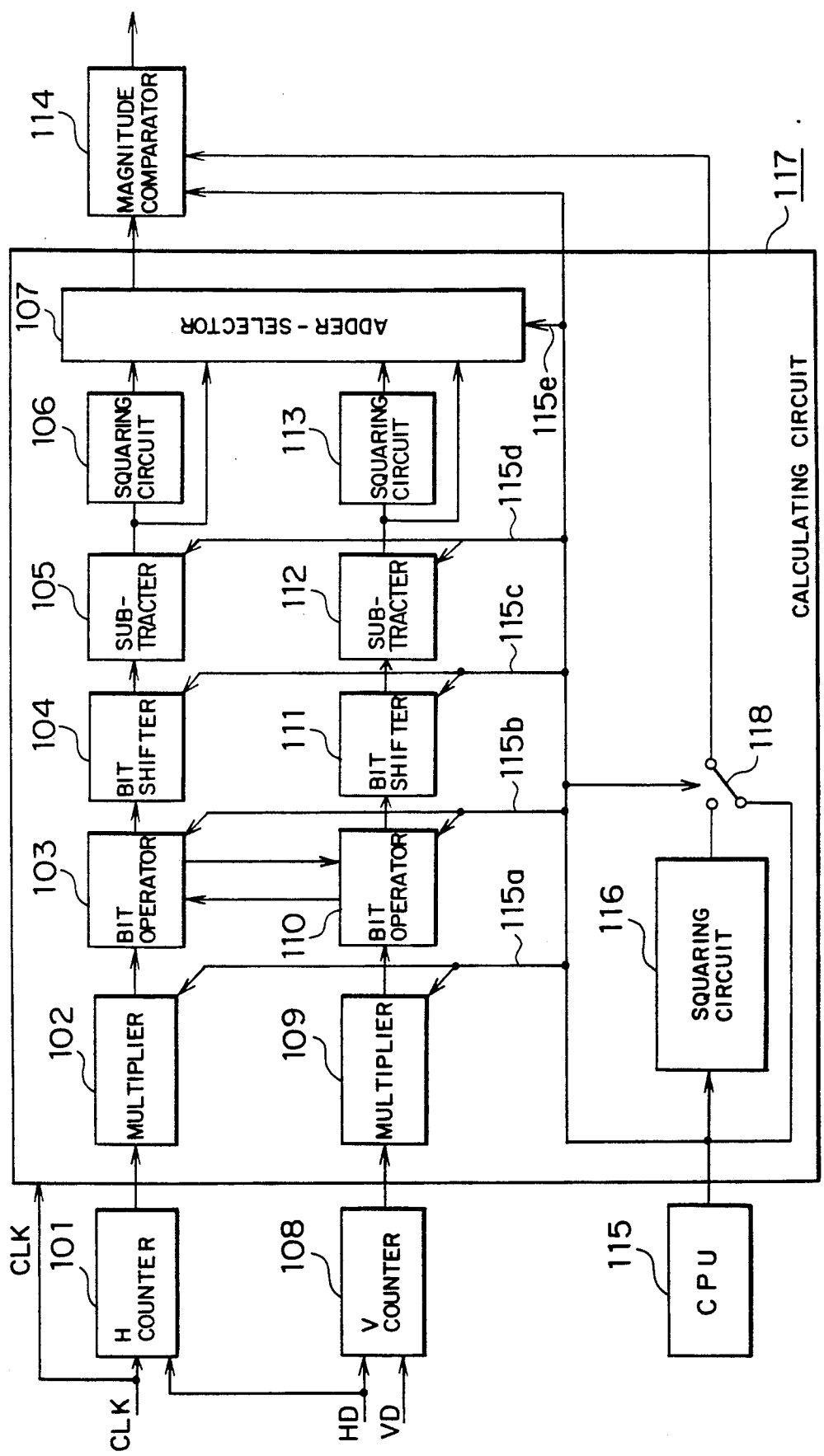
FIG. 2 is an outlined block diagram illustrating a digital wipe pattern generating device of an embodiment of the present invention.

FIG. 2 shows the construction of an embodiment of the present invention. In FIG. 2, reference numeral 101 is a counter, which counts a horizontal synchronization pulse H for every clock CLK and serves as a horizontal address generating means for generating a horizontal address in the binary form for an image; and 102 is a multiplier, which is a constituent element of a calculating circuit 117 acting as calculating means and multiplies the horizontal address generated by the counter 101 by a coefficient outputted by a CPU 115 through a line 115a to normalize the bit length of the horizontal address.

The CPU 115 stated above generates a wipe pattern selection instruction to the calculating circuit 117 and various sorts of coefficients.

103 is a bit operator, which operates bits of horizontal address data outputted by the multiplier 102 by using a coefficient outputted by the CPU 115 through a line 115b and decodes the horizontal address and the vertical address together with another bit operator 110 described later to generate a grating pattern or a random pattern and to output it to a bit shifter 104. The bit shifter 104 described above shifts various sorts of wipe patterns outputted by the bit operator 103 by a number of bits determined by a coefficient outputted by the CPU 115 through a line 115c to make it possible to generate multiple wipe patterns or mosaic wipe patterns.

105 is a subtracter, which makes it possible to vary the phase of the wipe pattern outputted by the bit shifter 104 according to a coefficient outputted by the CPU 115 to position the wipe pattern.

106 is a squaring circuit, which receives the output of the subtracter 105 and outputs a round or circular wipe pattern to an adder-selector 107.

On the other hand, 108 is a counter, which counts horizontal synchronization pulses HD and vertical synchronization pulses VD and serves as a vertical address generating means for generating a vertical address for an image.

109 is a multiplier, which multiplies the vertical address generated by the counter 108 by a coefficient outputted by the CPU 115 to normalize the bit length.

110 is a bit operator, which operates bits of vertical address data outputted by the multiplier 109 by using a coefficient outputted by the CPU 115 and decodes the vertical address and the horizontal address together with the bit operator 103 described above to generate a grating pattern or a random pattern.

111 is a bit shifter, which shifts various sorts of wipe patterns outputted by the bit operator 110 by a number of bits determined by a coefficient outputted by the CPU 115 to make it possible to generate multiple wipe patterns or mosaic wipe patterns.

112 is a subtracter, which makes it possible to vary the phase of the wipe pattern outputted by the bit shifter 111 according to a coefficient outputted by the CPU 115 to position the wipe pattern.

113 is a squaring circuit, which receives the output of the subtractor 112 and outputs a round wipe pattern to the adder-selector 107.

The adder-selector 107 is one, which adds the horizontal address data inputted from the subtracter 105 and the squaring circuit 106 and the vertical address data inputted from the subtracter 112 and the squaring circuit 113 and selects these horizontal address data or vertical address data by using coefficients outputted by the CPU 115.

In this way the calculating circuit 117 is composed of the multipliers 102 and 109, the bit operators 103 and 110, the bit shifters 104 and 111, the subtracters 105 and 112, the squaring circuits 106 and 113, and the adder-selector 107.

Further 116 is a squaring circuit for a round wipe, transforming the slice level outputted by the CPU 115 into a squared slice level, and 118 is a switch, which selects one of the squared slice level outputted by this squaring circuit 116 and the slice level outputted by the CPU 115.

Furthermore 114 is a magnitude comparator, which compares either one selected by the switch 118 from the slice level outputted by the CPU 115 and the squared slice level outputted by the squaring circuit with wipe address data outputted by the adder-selector 107 to generate a wipe pattern.

Now the operation of the embodiment described above will be explained. In FIG. 2, the counter 101 counts a horizontal synchronization pulse HD, every time a clock CLK is received, and generates binary horizontal address data, when the counted number of the pulses reaches a predetermined number. Similarly the counter 108 counts a vertical synchronization pulses VD, every time a horizontal synchronization pulse HD is received, and generates binary vertical address data, when the pulses are summed up to a predetermined number. The horizontal address data are sent to the multiplier 102 and they are multiplied by the coefficient given by the CPU 115 to normalize the bit length. In the case where the wipe pattern is made round, this multiplication can vary the aspect ratio. On the other hand, the vertical address data outputted by the counter 108 are multiplied also in the multiplier 109 by the coefficient from the CPU 115 to normalize the bit length.

Then outputs of these multipliers 102 and 109 are sent to the bit operators 103 and 110, respectively. The bit operator 103 effects an operation on the bits of the horizontal address data and on the other hand the bit operator 110 effects an operation on the bits of the vertical address data. The bit operation, by which the bits of the address data are operated, is e.g. an operation, by which only the most significant N bits are made pass through and all the loss significant bits are set at 0. The bit position to be operated is indicated by the coefficient given by the CPU 115 through the line 115b. In the bit operators 103 and 110, decoding of the horizontal address data and the vertical address data is effected on the basis of the coefficient coming from the CPU 115 to generate a wipe pattern such as a grating pattern, a random pattern, etc.

Further, the wipe patterns outputted by the bit operators 103 and 110 are sent to the bit shifters 104 and 111, respectively. In these bit shifters 104 and 111, bits are shifted as instructed by the coefficients given by the CPU 115 through the line 115c to generate the multiple wipe patterns or mosaic wipe patterns. The size of the mosaic can be changed by varying the coefficients.

The outputs of these bit shifters 104 and 111 are sent to the subtractors 105 and 112, respectively. In these subtracters 105 and 112, the phase of the wipe pattern can be varied by using the coefficient outputted by the CPU 115 through the output line 115d to position the pattern. The output of the subtracter 105 is applied to the squaring circuit 106 and the adder-selector 107. Similarly the output of the subtracter 112 is applied to the squaring circuit 113 and the adder-selector 107.

These squaring circuits 106 and 113 are used for round wipes. They square the outputs of the subtracters 105 and 112 to form a round wipe pattern by being added to each other in the adder-selector 107.

The adder-selector 107 selects a ratio thereof, depending on the coefficient given by the CPU 115 through the output line 115e, to determine a combination of round, oblique, vertical and horizontal wipes.

In addition, the CPU 115 outputs slice level data. These slice level data are supplied to one of the input terminals of the switch 118, and after being squared by the squaring circuit 116, they are supplied to the other input terminal of the switch 118. The switch 118 selects the output of the squaring circuit 116 for round wipe and the slice level data output from the CPU 115 for the other wipes according to the control signal from the CPU 115 to supply it as comparison data to the magnitude comparator 114.

This magnitude comparator 114 compares in magnitude and slices the wipe address data provided by the calculating circuit 117 with a slice level selected from the slice level outputted by the CPU 115 and the squared slice level data obtained by the squaring circuit 116, selected by the switch 118, to generate a required wipe pattern.

The squaring circuit 116 may be integrated in the CPU 115.

As described above, according to the present invention, the wipe pattern generating device is so constructed that the wipe address data are obtained by inputting the horizontal address and the vertical address therein, effecting a plurality of sorts of calculations in a digital manner by using predetermined coefficients outputted by the central processing unit, combining and selecting arbitrarily results of the calculations, comparing the wipe address data with the slice level or the squared slice level, and slicing them at this slice level or squared slice level.

In this way, a number of wipe patterns can be generated by selecting a combination of the calculations and all the processings can be effected in a digital manner. According to the invention, it becomes easier to fabricate the device, using ASICs or ICs and it is possible to intend to reduce the scale of the circuits.

What is claimed is:

1. A digital wipe pattern generating device comprising:
    horizontal address generating means for counting horizontal synchronization pulses to generate a horizontal address for an image;
    vertical address generating means for counting vertical synchronization pulses to generate a vertical address for said image;
    a central processing unit for generating a predetermined coefficient and a slice level;
    calculating means for applying to said horizontal address and said vertical address a plurality of sorts of calculations in a digital manner while using said predetermined coefficient and selectively combining results of said calculations to obtain wipe address data;
    a squaring circuit for squaring said slice level to obtain a squared slice level;
    a switch for selectively providing an output comprising either one of said slice level and said squared slice level; and
    means for generating a wipe pattern by slicing said wipe address data at a level equal to said output of said switch.

2. A digital wipe pattern generating device according to claim 1, wherein said calculating means comprises multipliers for normalizing said horizontal address and said vertical address respectively; bit operators for operating bits of respective outputs of said multipliers; bit shifters for shifting bits of respective outputs of said bit operators by predetermined numbers of bits, respectively; subtracters for subtracting a predetermined coefficient from respective outputs of said bit shifters; squaring circuits for squaring respective outputs of said subtracters; and an adder-selector for selectively combining outputs of said subtracters and said squaring circuits to generate said wipe address data.

* * * * *